United States Patent [19]
Sato et al.

[11] Patent Number: 5,862,049
[45] Date of Patent: Jan. 19, 1999

[54] COORDINATE INPUT APPARATUS AND CONTROL METHOD THEREFOR

[75] Inventors: Hajime Sato, Yokohama; Atsushi Tanaka, Yamato; Yuichiro Yoshimura, Kamakura; Ryozo Yanagisawa, Chiba; Katsuyuki Kobayashi, Yokohama; Masaki Tokioka, Fujisawa, all of Japan

[73] Assignee: Canon Kabushiki Kaisha, Tokyo, Japan

[21] Appl. No.: 621,977

[22] Filed: Mar. 26, 1996

[30] Foreign Application Priority Data

Mar. 28, 1995 [JP] Japan .................................. 7-069385

[51] Int. Cl.$^6$ .................................................. G05B 19/42
[52] U.S. Cl. ................... 364/190; 364/712; 364/709.11; 178/19; 345/177; 345/179
[58] Field of Search .............................. 364/190, 709.11, 364/712; 178/18, 19; 340/706, 712

[56] References Cited

U.S. PATENT DOCUMENTS

| | | | |
|---|---|---|---|
| 4,845,346 | 7/1989 | Ouchi et al. | 250/221 |
| 4,903,012 | 2/1990 | Ohuchi | 340/709 |
| 4,959,805 | 9/1990 | Ohouchi et al. | 364/562 |
| 5,017,913 | 5/1991 | Kaneko et al. | 340/712 |
| 5,070,325 | 12/1991 | Tanaka et al. | 340/706 |
| 5,142,106 | 8/1992 | Yoshimura et al. | 178/18 |
| 5,352,856 | 10/1994 | Tanaka et al. | 178/18 |
| 5,362,930 | 11/1994 | Yoshimura et al. | 178/18 |
| 5,484,967 | 1/1996 | Yanagisawa et al. | 178/19 |
| 5,561,447 | 10/1996 | Suzuki et al. | 345/179 |
| 5,565,893 | 10/1996 | Sato et al. | 345/177 |
| 5,610,838 | 3/1997 | Tokioka et al. | 364/508 |

FOREIGN PATENT DOCUMENTS

| | | |
|---|---|---|
| 0 423 843 | 4/1991 | European Pat. Off. . |
| 0 623 892 | 11/1994 | European Pat. Off. . |
| 0 623 893 | 11/1994 | European Pat. Off. . |

*Primary Examiner*—Reba I. Elmore
*Assistant Examiner*—Ramesh Patel
*Attorney, Agent, or Firm*—Fitzpatrick, Cella, Harper & Scinto

[57] ABSTRACT

Continuity of coordinates between areas of a coordinate input surface which is divided into a plurality of areas is maintained. In inputting "A, B, C" on a coordinate input plate, when an input operation is started from an initial point, area is determined as an input area, and vibration delay times are measured by using sensors, thereby calculating a coordinate value. When the input operation is continued up to a terminal point, the input point shifts to area. However, vibrations are detected by using the same sensors to calculate a coordinate value as long as the input operation is continuously performed. With this operation, since sensors are not changed for the respective areas, discontinuity of lines at the boundaries between the areas can be prevented.

18 Claims, 9 Drawing Sheets

COORDINATE INPUT APPARATUS AND CONTROL METHOD THEREFOR

BACKGROUND OF THE INVENTION

1. Field of the Invention

The present invention relates to a coordinate input apparatus and, more particularly, to a coordinate input apparatus for determining the coordinates of a point indicated by a pen.

2. Related Background Art

In a conventional coordinate input apparatus having a vibration input pen using ultrasonic waves as an input device, a delay time taken for vibrations caused by the vibration input pen to reach a vibration detection point is counted, and a distance is calculated by a controller on the basis of the delay time. Coordinates are then calculated and output on the basis of the distance. The size of a vibration transfer plate capable of inputting a vibration with the vibration input pen is decided by the detection gain at the vibration detection point or the output level at the vibration detection point. In contrast to this, the gain at the vibration detection point or the output level of the vibration input pen is sometimes changed in accordance with the size of the vibration transfer plate. The number of vibration detection points is set in consideration of coordinate calculation precision. For example, three or four points are arranged on an A4 size plate or the like.

When a vibration transfer plate larger than an A4 size plate is to be used, three or more vibration detection points are generally arranged in the longitudinal direction of the plate, and three or more points in its widthwise direction.

FIG. 9 is a view for explaining a conventional technique. The coordinate input apparatus shown in FIG. 9 has a vibration transfer plate and eight vibration sensors which are arranged on the plate at the positions in FIG. 9. A vibration input pen is used to indicate a position in one of areas 1 to 4. Different vibration sensors are used in the respective areas. Sensors 6a, 6b, and 6d are used in area 1; the sensor 6b and sensors 6c and 6e, in area 2; the sensor 6d and sensors 6f and 6g, in area 3; and the sensors 6e and 6g and a sensor 6h, in area 4. Switching of the vibration sensors in the respective areas is executed by a controller.

In the above conventional technique, however, since the different sensors are used to calculate coordinates in the respective areas, coordinate calculation errors are caused owing to variations in the vibration sensors constituting a coordinate input apparatus, the respective vibration detectors, and the like, the position precision of each vibration sensor, and the like.

As shown in FIG. 9, therefore, when letters "A", "B", and "C" are to be drawn, the character portions are shifted from each other at the boundaries between the respective areas, resulting in poor readability.

SUMMARY OF THE INVENTION

The present invention has been made in consideration of the above conventional technique. Therefore, it is an object of this invention to provide a coordinate input apparatus which maintains continuity of areas when outputting coordinate outputs by switching many sensors for the respective areas, and a control method therefor.

It is a further object of the invention to provide a method of controlling a coordinate input apparatus which is divided into a plurality of areas, and has vibration detection points in the respective areas, comprising the first determination step of determining an area including a first vibration input point, the second determination step of determining vibration detection points in accordance with the determined area, and the calculation step of detecting vibration delay times at the detection points determined in the second determination step in a predetermined interval, and calculating a coordinate value by a procedure according to the area in which the input point is included on the basis of the delay times.

DETAILED DESCRIPTION OF THE PREFERRED EMBODIMENTS

[First Embodiment]

Figure 1:
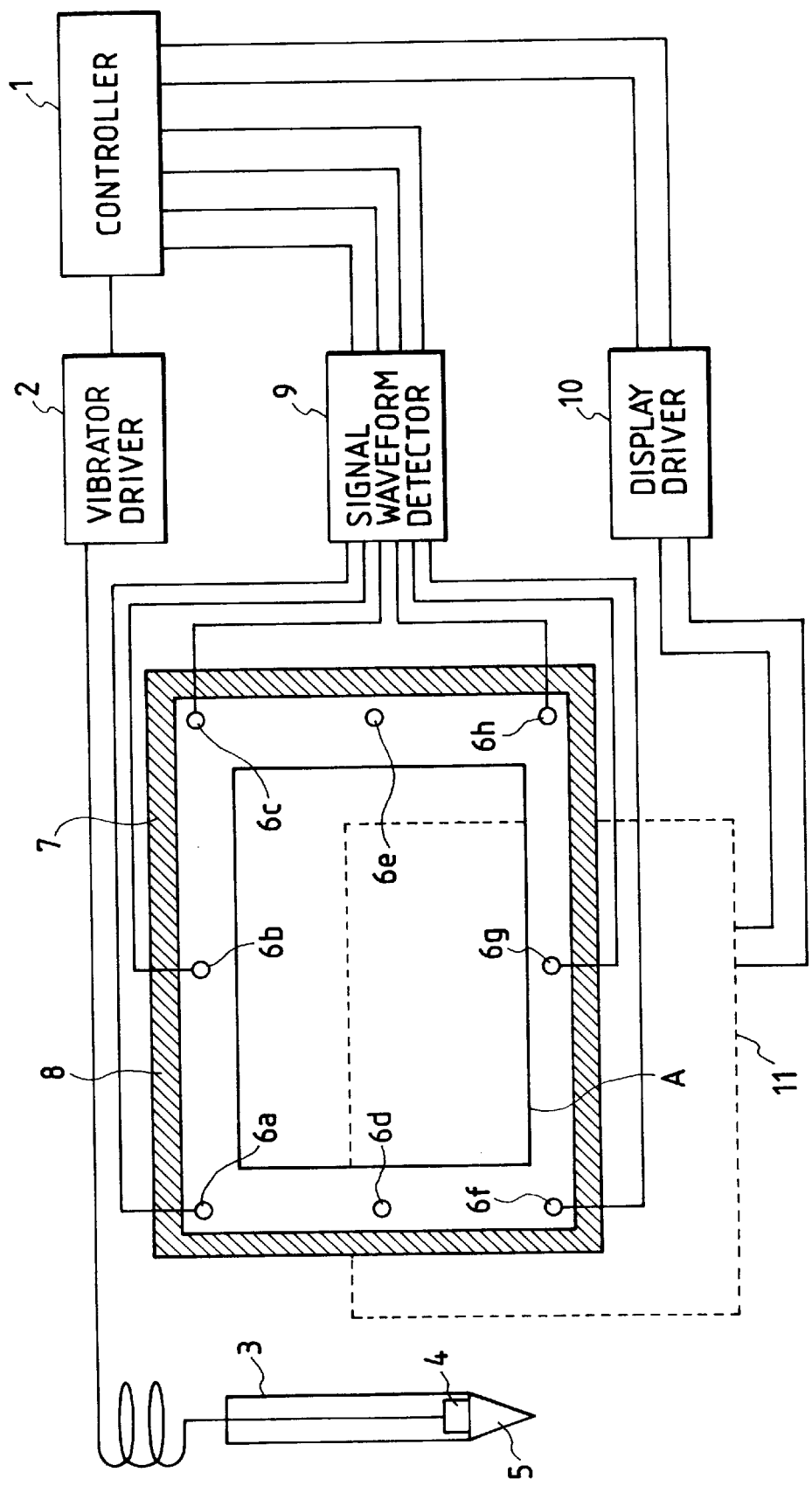
FIG. 1 is a block diagram showing a coordinate input apparatus according to the first embodiment of the present invention.

FIG. 1 shows the arrangement of a coordinate input apparatus according to the first embodiment. Referring to FIG. 1, a controller 1 controls the overall apparatus and calculates a coordinate position. A vibrator driver 2 vibrates a vibrator 4 and a pen tip 5 in a vibration input pen 3. A vibration transfer plate 8 is made of a transparent member such as an acrylic or glass plate. A coordinate input operation is performing by touching the vibration transfer plate 8 with the vibration input pen 3. In practice, a user indicates a point in an area A (effective area) indicated by the solid lines in FIG. 1 with the vibration input pen 3. A vibration prevention member 7 for preventing (reducing) reflected vibrations from returning is arranged around the vibration transfer plate 8. Vibration sensors 6a to 6h, such as piezoelectric elements, for converting mechanical vibrations into electrical signals are fixed on the boundary between the plate 8 and the member 7.

A signal waveform detector 9 outputs signals representing vibrations detected by the vibration sensors 6a to 6h. A display 11 is a liquid crystal display device or the like which can display information in units of dots. The display 11 is disposed behind the vibration transfer plate 8. The display 11 is driven by a display driver 10 to display a dot at a position indicated by the vibration input pen 3, and the user can see the dot through the vibration transfer plate 8 (made of a transparent member).

The vibrator 4 incorporated in the vibration input pen 3 is driven by the vibrator driver 2. A drive signal for the vibrator 4 is supplied as a low-level pulse signal from the controller 1 and amplified by the vibrator driver 2 with a predetermined gain. The amplified signal is then applied to the vibrator 4.

The electrical drive signal is converted into mechanical ultrasonic vibrations by the vibrator 4. The vibrations are transferred to the vibration transfer plate 8 via the pen tip 5.

In this case, the vibration frequency of the vibrator 4 is set to a value which can generate plate waves in the vibration transfer plate 8 such as a glass plate. In driving the vibrator 4, a mode of vibration in a direction perpendicular to the vibration transfer plate 8 is selected. In addition, if the vibration frequency of the vibrator 4 is set to be a resonance frequency, considering the pen tip 5 as well, highly efficient vibration conversion can be realized.

As described above, elastic waves transferred to the vibration transfer plate 8 are lamb waves, which are not easily influenced by flaws on the surface of the vibration transfer plate, obstacles, and the like, as compared with surface waves.

<Controller>

In the above arrangement, the controller 1 outputs a signal to the vibrator driver 2 to cause it to drive the vibrator 4 in the vibration input pen 3, and causes the internal timer (constituted by a counter) to start counting the timer. Vibrations generated by the vibration input pen 3 reach the vibration sensors 6a to 6h with delays corresponding to the distances thereto.

The signal waveform detector 9 detects signals from the vibration sensors 6a to 6h, and performs waveform detection processing (to be described later) to generate signals representing the timings taken for the vibrations to reach the vibration sensors 6a to 6h. The controller 1 receives these signals for the respective sensors, and detects the times taken for the vibrations to reach the vibration sensors 6a to 6h, thereby calculating a coordinate position indicated by the vibration pen.

The controller 1 drives the display driver 10 on the basis of the calculated position information of the vibration input pen 3 to control a display operation performed by the display 11 or output a coordinate output to an external device by serial or parallel communication (not shown).

Figure 2:
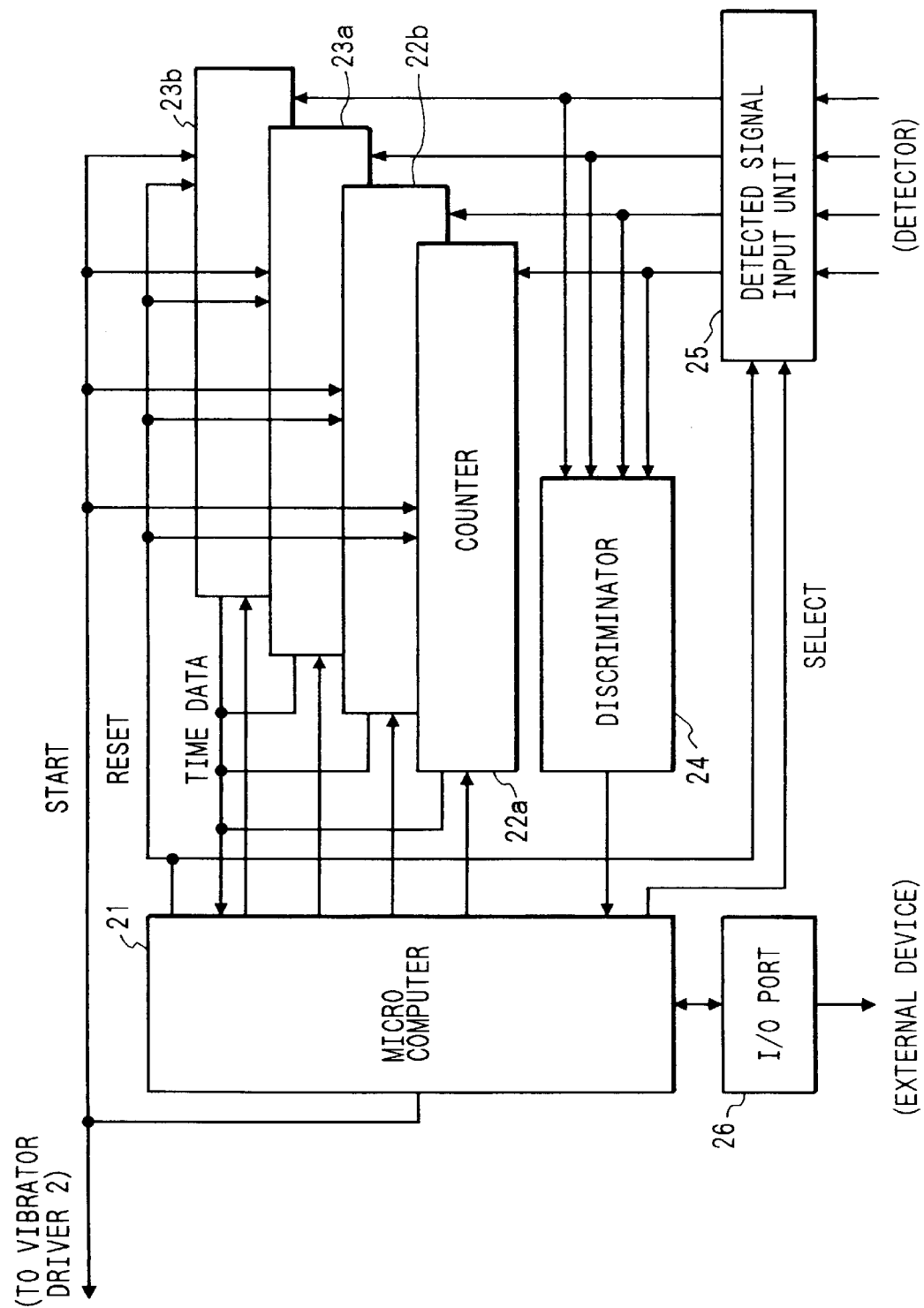
FIG. 2 is a block diagram showing the internal arrangement of a controller.

FIG. 2 is a block diagram showing the schematic arrangement of the controller 1 of this embodiment. Each constituent element and an outline of its operation will be described below.

Referring to FIG. 2, a microcomputer 21 controls the controller 1 and the overall coordinate input apparatus of this embodiment. The microcomputer 21 is constituted by an internal counter, a ROM storing procedures, a RAM used for calculation and the like, and a nonvolatile memory storing constants and the like.

This apparatus includes counters 22a to 23b. The signals representing the delay times by which the vibrations reach the vibration sensors 6a to 6h are input to the respective counters via a detected signal input unit 25 in the following manner. Group delay time signals Tga, Tgc, and Tgh from the vibration sensors 6a, 6c, 6f, and 6h are input to the counter 22a. Group delay time signals Tgb, Tgd, Tge, and Tgg from the vibration sensors 6b, 6d, 6e, and 6g are input to the counter 22b. Phase delay time signals Tpa, Tpc, Tpf, and Tph from the vibration sensors 6a, 6c, 6f, and 6h are input to the counter 23a. Phase delay time signals Tpb, Tpd, Tpe, and Tpg from the vibration sensors 6b, 6d, 6e, and 6g are input to the counter 23b.

When a discriminator 24 determines that a signal is received, the discriminator 24 outputs a signal indicating the reception of the signal to the microcomputer 21. The microcomputer 21 performs a predetermined calculation to calculate the coordinate position of the vibration input pen 3 on the vibration transfer plate 8. With this operation, a dot can be displayed at the corresponding position on the display 11 through an I/O port 26. Alternatively, a coordinate value can be output to an external device by outputting coordinate position information to an interface circuit through the I/O port 26.

<Vibration Propagation Time Detection>

The principle of measurement of the times taken for vibrations to reach the vibration sensors 6a to 6h will be described below.

Figure 3:
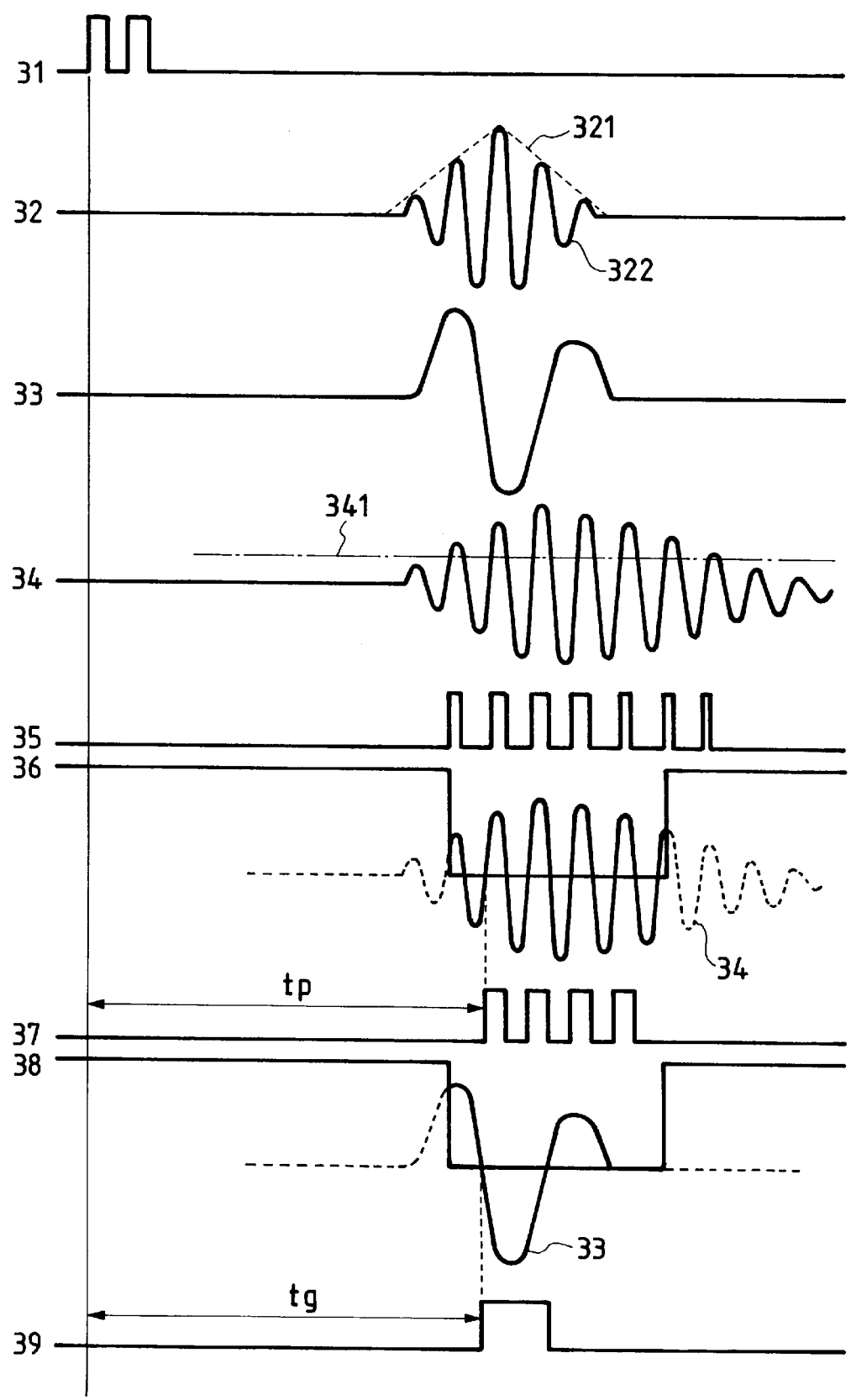
FIG. 3 is a timing chart showing signal processing.
Figure 4:
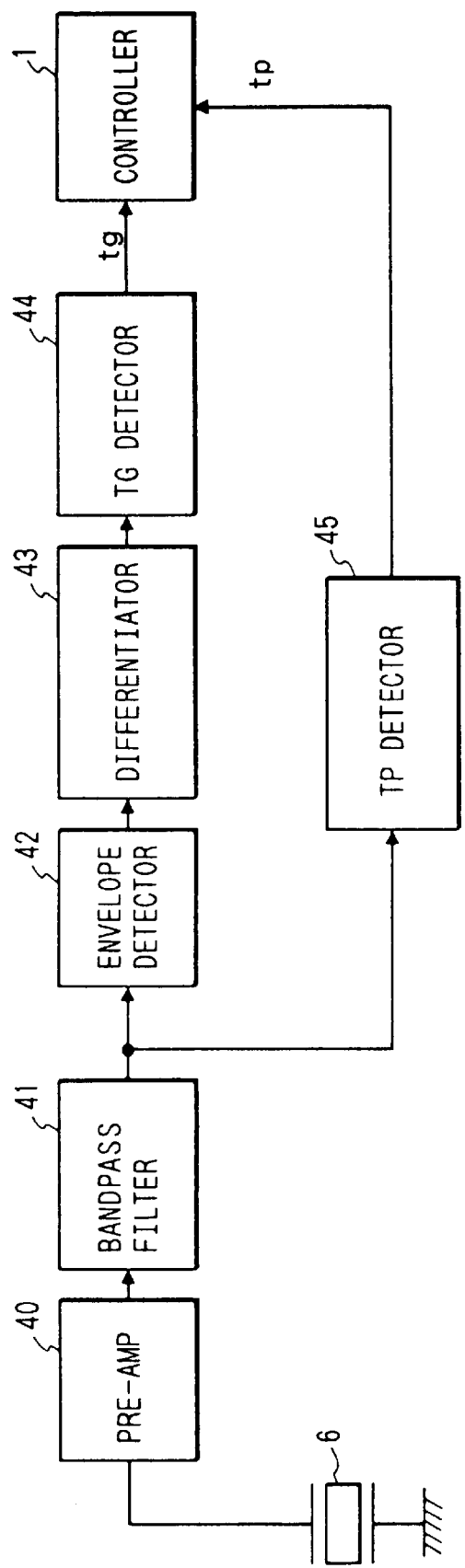
FIG. 4 is a block diagram showing a signal detector.

FIG. 3 is a timing chart for explaining detection waveforms input to the signal waveform detector 9, and measurement processing of vibration transfer times based on the input waveforms. FIG. 4 is a block diagram showing the arrangement of the signal waveform detector 9. A case associated with the vibration sensor 6a will be described below. The same applies to the remaining vibration sensors 6b to 6h.

Measurement of the time taken for vibrations to reach the vibration sensor 6a is started at the same time a start signal is output to the vibration input pen 3. At this time, a drive signal 31 is applied from the vibrator driver 2 to the vibrator 4. With this signal 31, ultrasonic vibrations transferred from the vibration input pen 3 to the vibration transfer plate 8 propagate for the time corresponding to the distance to the vibration sensor 6a, and are detected by the vibration sensor 6a. A signal 32 in FIG. 3 indicates a signal waveform detected by the vibration sensor 6a.

An envelope 321 is extracted from the signal waveform detected by the vibration sensor 6a by an envelope detector 42. The extracted envelope signal is differentiated by a differentiator 43 twice to have a waveform 33. A Tg detector 44 is constituted by a monostable multivibrator and the like. The Tg detector 44 forms a signal tg as a delay time detection signal by detecting the zero-crossing point of the envelope after its peak exceeds a predetermined level 341.

A phase signal 322 is formed into a pulse signal 35 as a portion exceeding a predetermined level threshold 341 of an output 34 from a bandpass filter 41. A window signal 36 having a predetermined width is generated with respect to the signal 35, and the time up to a zero-crossing point is represented by tp.

The relationship with a phase changes during transfer of vibrations in accordance with the distance they are transferred. Let Vg be the propagating velocity of the envelope 321, i.e., a group velocity, and Vp be the propagating velocity of the phase 322, i.e., a phase velocity. The distance between the vibration input pen 3 and the vibration sensor 6a can be detected from the group velocity Vg and the phase velocity Vp.

When only the envelope 321 is taken into consideration, its velocity is represented by Vg. Letting tg be the vibration transfer time, the distance between the vibration input pen 3 and the vibration sensor 6a is given by $$d = Vg \cdot tg \tag{1}$$

Although this equation is associated with only the vibration sensor 6a, the distance between the vibration input pen 3 and each of the seven remaining vibration sensors 6b to 6h can be given by the same equation.

Furthermore, processing based on the phase signal is performed to determine coordinate with higher precision. The distance between the vibration sensor and the vibration pen is given by the following equation according to the time tp detected from the phase waveform signal 322 in the above manner:

$$d = n \cdot \lambda p + Vp \cdot tp \tag{2}$$

where $\lambda p$ is the wavelength of the elastic wave, and n is an integer.

From equations (1) and (2), the integer n is given by $$n = [(Vg \cdot tg - Vp \cdot tp)/\lambda p + 1/N] \tag{3}$$

where N is a proper real number other than "0". If, for example, N=2, n can be determined as long as the vibrations are represented by the signal tg or the like having a waveform falling within a range of ±½ wavelength.

With a substitution of n obtained in the above manner into equation (2), the distance between the vibration input pen 3 and the vibration sensor 6a can be measured with high precision.

The above-described circuit is associated with the vibration sensor 6a. The same circuit as the above circuit is provided for each of the remaining vibration sensors.

<Vibration Sensor Control (FIGS. 5 and 6)>

Figure 5:
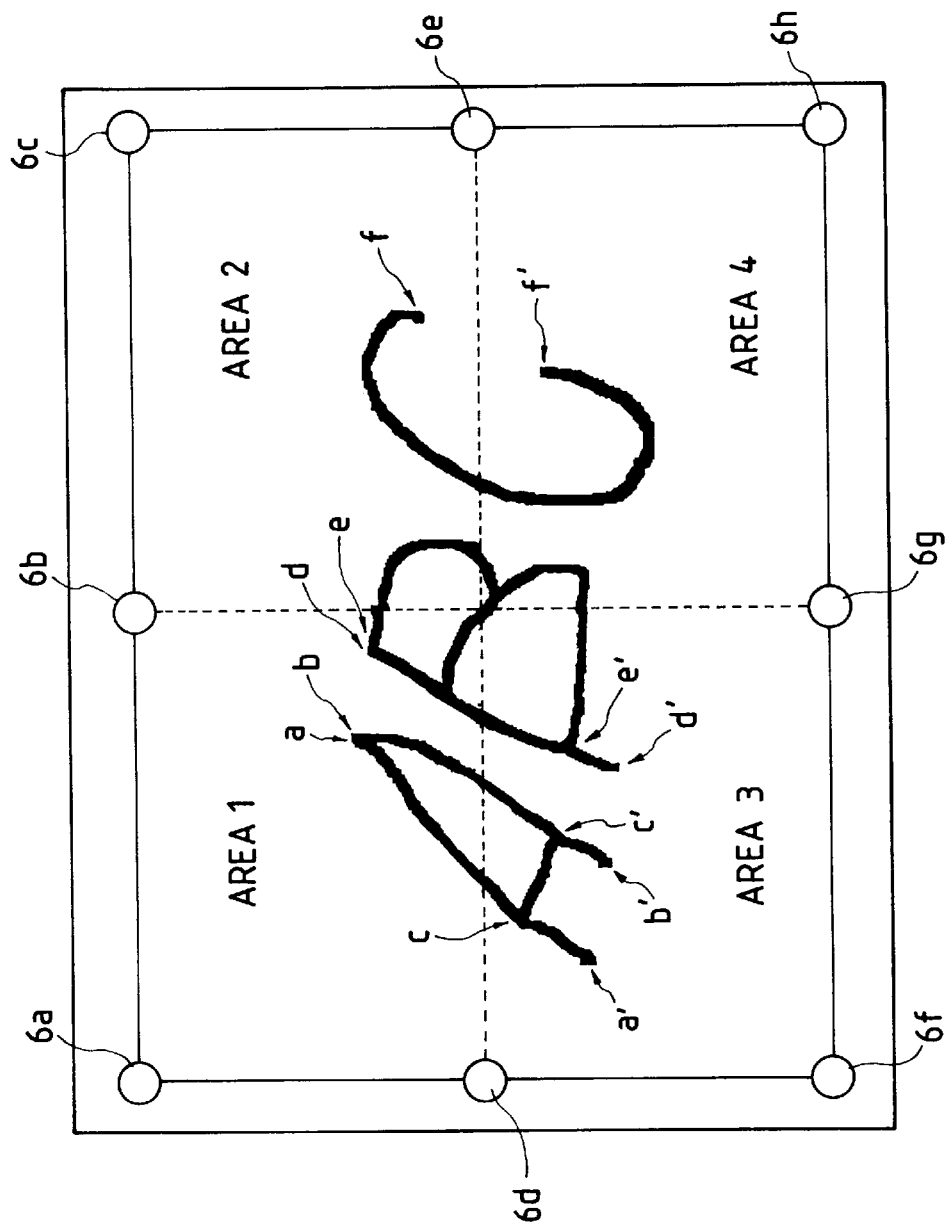
FIG. 5 is a view for explaining switching control of vibration sensors.

FIG. 5 is a view for explaining control of the vibration sensors 6a to 6h in a case wherein an input operation is performed with the vibration input pen 3. An input operation is performed with the vibration input pen 3 with respect to one of areas 1 to 4 in FIG. 5. In this embodiment, three sensors are required to calculate coordinates (equations for coordinate calculation will be described next).

A method of controlling the vibration sensors 6a to 6h used to calculate coordinates when letters "A", "B", and "C" are to be drawn will be described with reference to FIG. 5.

When an input operation is started from an initial point a in drawing letter "A", since the initial point a is in area 1, the vibration sensors 6a, 6b, and 6d are used to calculate coordinates. Whether an input operation is performed with respect to a specific area with the vibration input pen 3 is determined on the basis of one of the vibration sensors 6a, 6c, 6f, and 6h which receives vibrations from the vibration input pen 3 first. The vibration sensors are not switched in the interval between the instant at which the initial point a is input and the instant at which one stroke is input. That is, the vibration sensors 6a, 6b, and 6d are used from the initial point a to an terminal point a'. Whether one stroke is input is determined on the basis of whether the vibration input pen 3 is in contact with the vibration transfer plate 8 (pen up/pen down).

Figure 6:
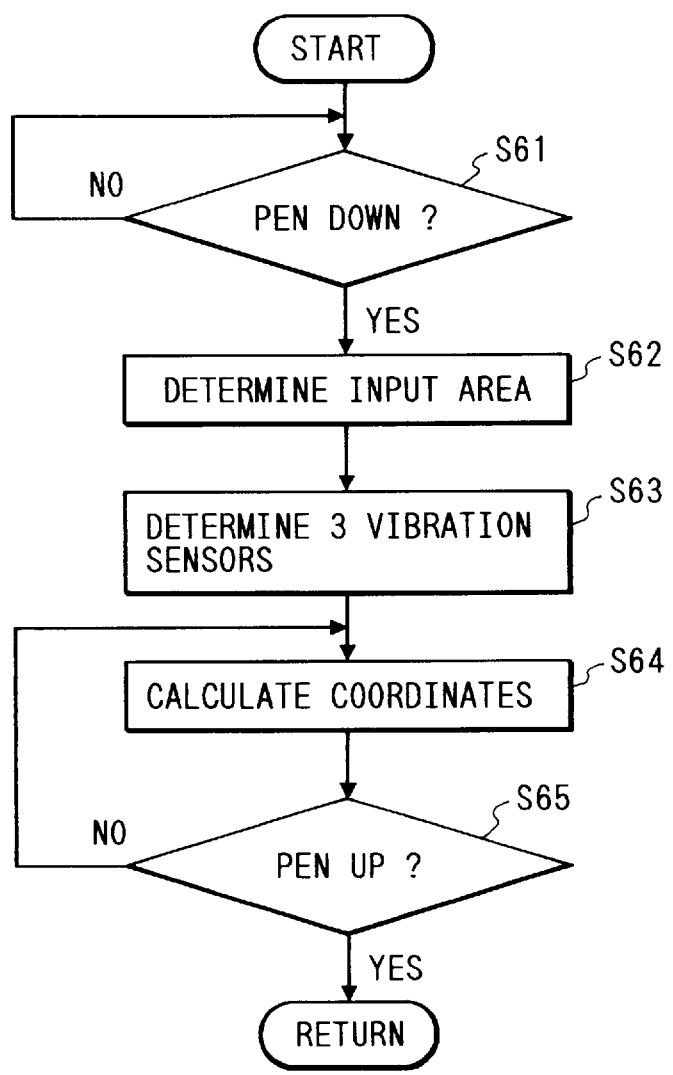
FIG. 6 is a flow chart for explaining switching control of the vibration sensors.

The above operation will be described with reference to FIG. 6. In executing determination of pen up/pen down in step S61, the discriminator 24 determines that a signal from the vibration input pen 3 is received, and outputs a signal representing the corresponding information to the microcomputer 21. If "pen down" is determined, the area in which an input operation is performed with the vibration input pen 3 is determined by the first vibration sensor which has received the signal first, and the second vibration sensor which has received the signal second in step S62. In step S63, after the area is determined, three vibration sensors to be used in coordinate calculation are determined. In step S64, coordinate calculation is performed using the vibration sensors determined in step S63. After the area is determined, three vibration sensors used to calculate coordinates are determined. After the coordinates are calculated, "pen up/pen down" is determined in step S65. If "pen down" is still determined, coordinate calculation is continuously executed by using predetermined coordinate calculation equations which correspond to the current input area without switching the vibration sensors. In this case as well, in order to determine equations to be used, a specific area in which an input operation is performed must be determined. This operation may be performed in the same manner as in step S62. If "pen up" is determined, the flow waits for the next input operation. The above steps are executed with respect to initial points b to f and terminal points b' to f' in the same manner as described above.

<Coordinate Position Calculation (FIG. 7)>

The principle of calculation of the coordinate position of the vibration input pen 3 on the vibration transfer plate 8 will be described next.

In this embodiment, only a case wherein an initial point is input in area 1 on the vibration transfer plate 8 in FIG. 7 will be described. When, however, initial points are input in areas 3 and 4, coordinates can be calculated in the same manner to be described below. Equations for coordinate calculation are based on the Pythagorean theorem, and different coordinate calculation schemes are used depending on areas in which the terminal points of strokes of the vibration input pen 3 are input.

Figure 7:
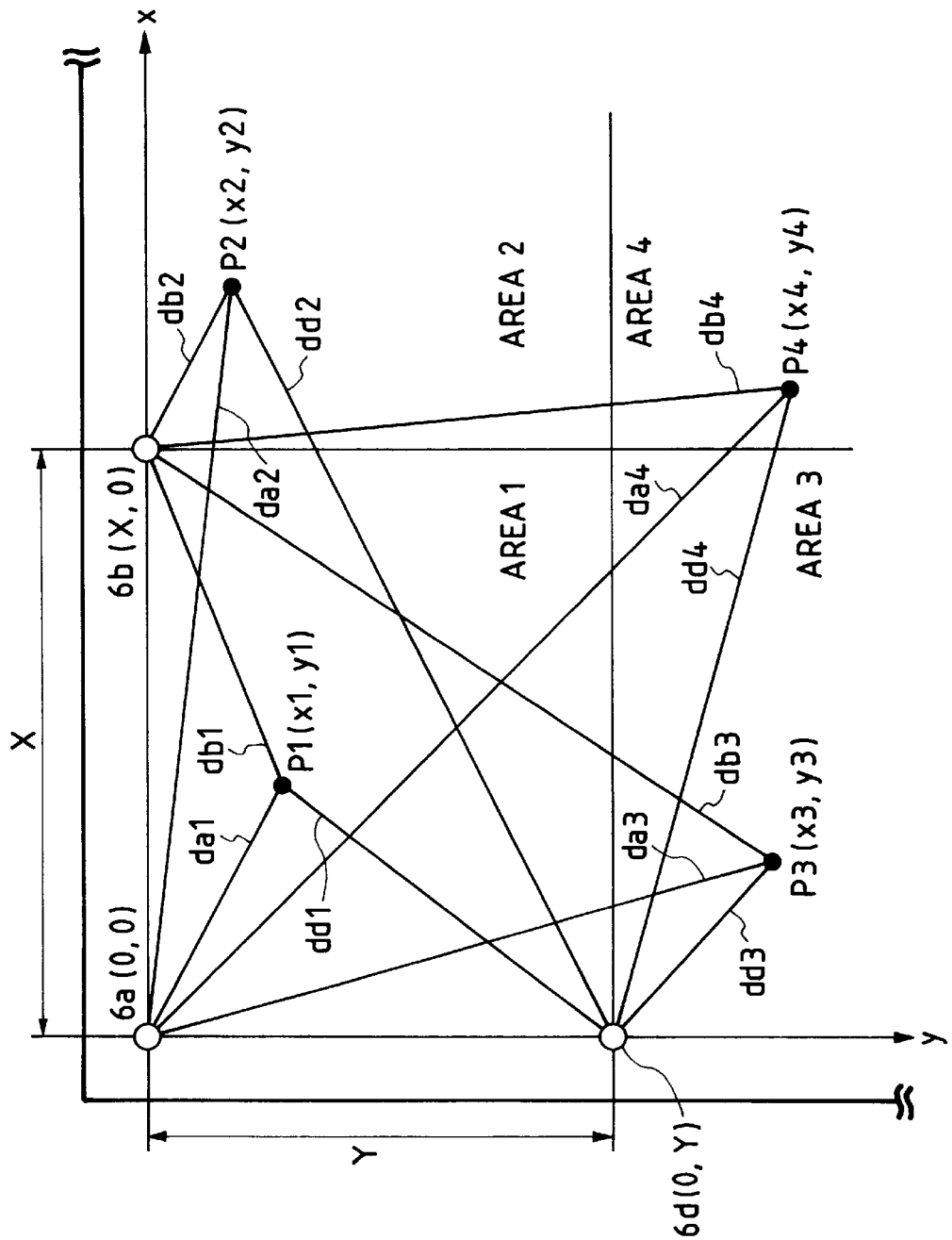
FIG. 7 is a view for explaining the coordinate system of the coordinate input apparatus and equations for coordinate calculation.

When the vibration sensors 6a, 6b, and 6d are arranged at the positions in FIG. 7, linear distances da, db, and dd from a position P of the vibration input pen 3 to the vibration sensors 6a, 6b, and 6d can be obtained on the basis of the principle described above. The controller 1 can obtain the coordinates (x,y) of the position P of the vibration input pen 3 on the basis of the linear distances da, db, and dd in the following manner.

1 Coordinates in area 1, i.e., P1(x1,y1) in FIG. 7:

$$x1=X/2+(da1+db1)\cdot(da1-db1)/2X \quad (4)$$

$$y1=Y/2+(da1+dd1)\cdot(da1-dd1)/2Y \quad (5)$$

2 Coordinates in area 2, i.e., P2(x2,y2) in FIG. 7:

$$x2=3X/2+(da2+db2)\cdot(da2-db2)/2X \quad (6)$$

$$y2=Y/2+(da2+dd2)\cdot(da2-dd2)/2Y \quad (7)$$

3 Coordinates in area 3, i.e., P3(x3,y3) in FIG. 7:

$$x3=X/2+(da3+db3)\cdot(da3-db3)/2X \quad (8)$$

$$y3=3Y/2+(da3+dd3)\cdot(da3-dd3)/2Y \quad (9)$$

4 Coordinates in area 4, i.e., P4(x4,y4) in FIG. 7:

$$x4=3X/2+(da4+db4)\cdot(da4-db4)/2X \quad (10)$$

$$y4=3Y/2+(da4+dd4)\cdot(da4-dd4)/2Y \quad (11)$$

Referring to FIG. 7, the distances between the vibration sensors 6a and 6b, and the vibration sensors 6a and 6d are respectively represented by X and Y.

As described above, the vibration transfer plate is divided into areas in the longitudinal or widthwise direction, and different sensors are combined for each area to calculate coordinates. With this arrangement, continuity and readability on the boundaries can be improved.

[Second Embodiment]

The input area determination means determines an input area on the basis of a vibration sensor which receives vibrations from the vibration input pen 3 first. An input area determination means for initial points in the second embodiment is the same as that in the first embodiment. However, input area determination means for second and subsequent points are different from those in the first embodiment.

Assume that letter "B" is to be drawn, as shown in FIG. 5. In this case, an area where an initial point d is input is determined as area 1 in the same manner as in the first embodiment. The locus of a vibration input pen 3 from the initial point d to a terminal point d' changes as follows: area 1→area 2→area 4→area 1→area 4→area 3. Since the input area of the initial point d is area 1, sensors 6a, 6b, and 6d are used to detect delay times. Consider the vibration sensor 6a in determining an input area. When the vibration input pen 3 moves from area 1 to area 2, the vibration sensor 6a and a vibration sensor 6c detect the same delay time at the boundary. If, therefore, the delay times detected by the sensors 6a and 6c are equal to each other, area 2 is determined to calculate coordinates.

When the vibration input pen 3 moves from area 2 to area 1, the vibration sensors 6a and 6c detect the same delay time at the boundary again. In this case, therefore, area 1 is determined to calculate coordinates.

When the vibration input pen 3 moves from area 1 to area 3, the vibration sensor 6a and a sensor 6f detect the same delay time at the boundary. In this case, therefore, area 3 is determined to calculate coordinates. Similarly, when the vibration input pen 3 moves from area 2 to area 4, an area is determined on the basis of the delay times detected by the vibration sensors 6a and 6f. When the vibration input pen 3 moves from area 4 to area 3, an area is discriminated on the basis of the delay times detected by the vibration sensors 6a and 6c. Equations are determined on the basis of the determination results to calculate coordinates. The same applies to coordinate calculation for movements between other areas below.

With the above operation, an input area can be discriminated by detecting delay times using only a vibration sensor (the vibration sensor 6a if the initial point is in area 1) corresponding to the input area of an initial point and a vibration sensor corresponding to a preceding input area without detecting delay times using all the vibration sensors.

[Third Embodiment]

In the first and second embodiments, the vibration input pen 3 is used to perform a continuous input operation. In the third embodiment, however, the present invention is applied to a case wherein a graphic pattern or the like is drawn by a pointing operation. The vibration detection principle and the coordinate calculation principle are therefore the same as those in the first embodiment.

In inputting a graphic pattern or the like, for example, a straight line may be drawn as follows. The initial and terminal points of the straight line to be drawn are indicated first. The two points are then connected. As a result, information indicating the straight line is output. In drawing a polygon, its vertexes are indicated by a pointing operation, and the vertexes are connected, thereby drawing a desired graphic pattern. Such a scheme is called a pointing mode.

Figure 8:
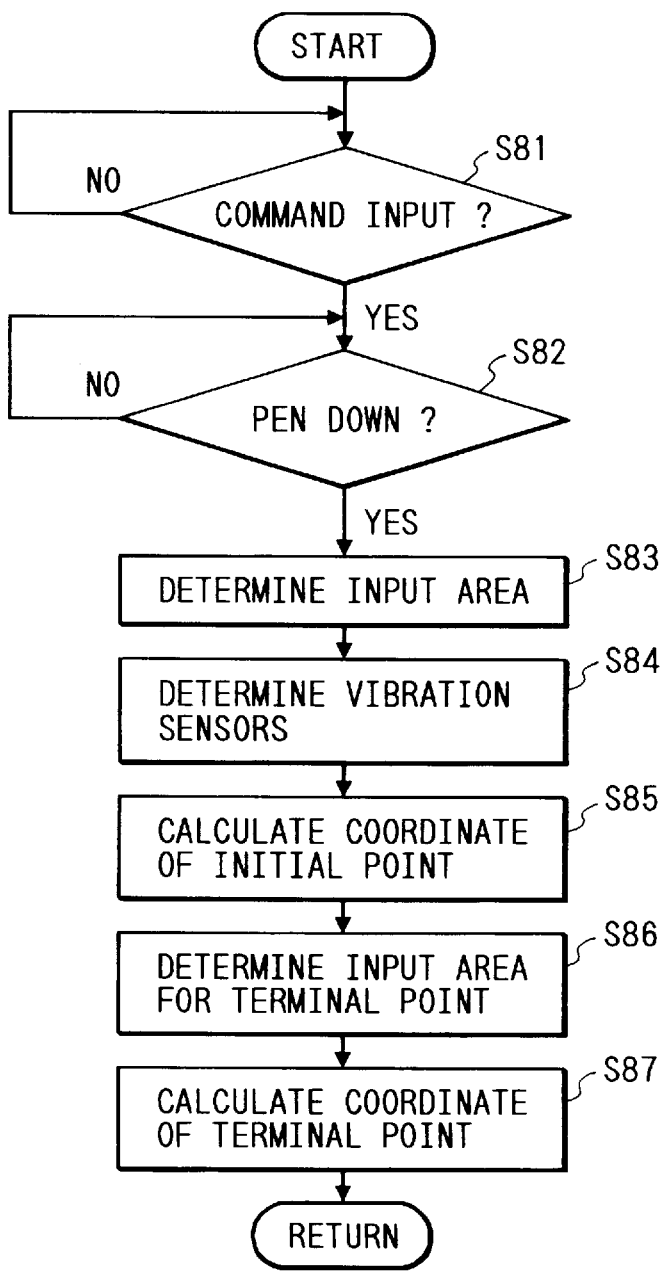
FIG. 8 is a flow chart for explaining switching control of vibration sensors in the second embodiment of the present invention.
Figure 9:
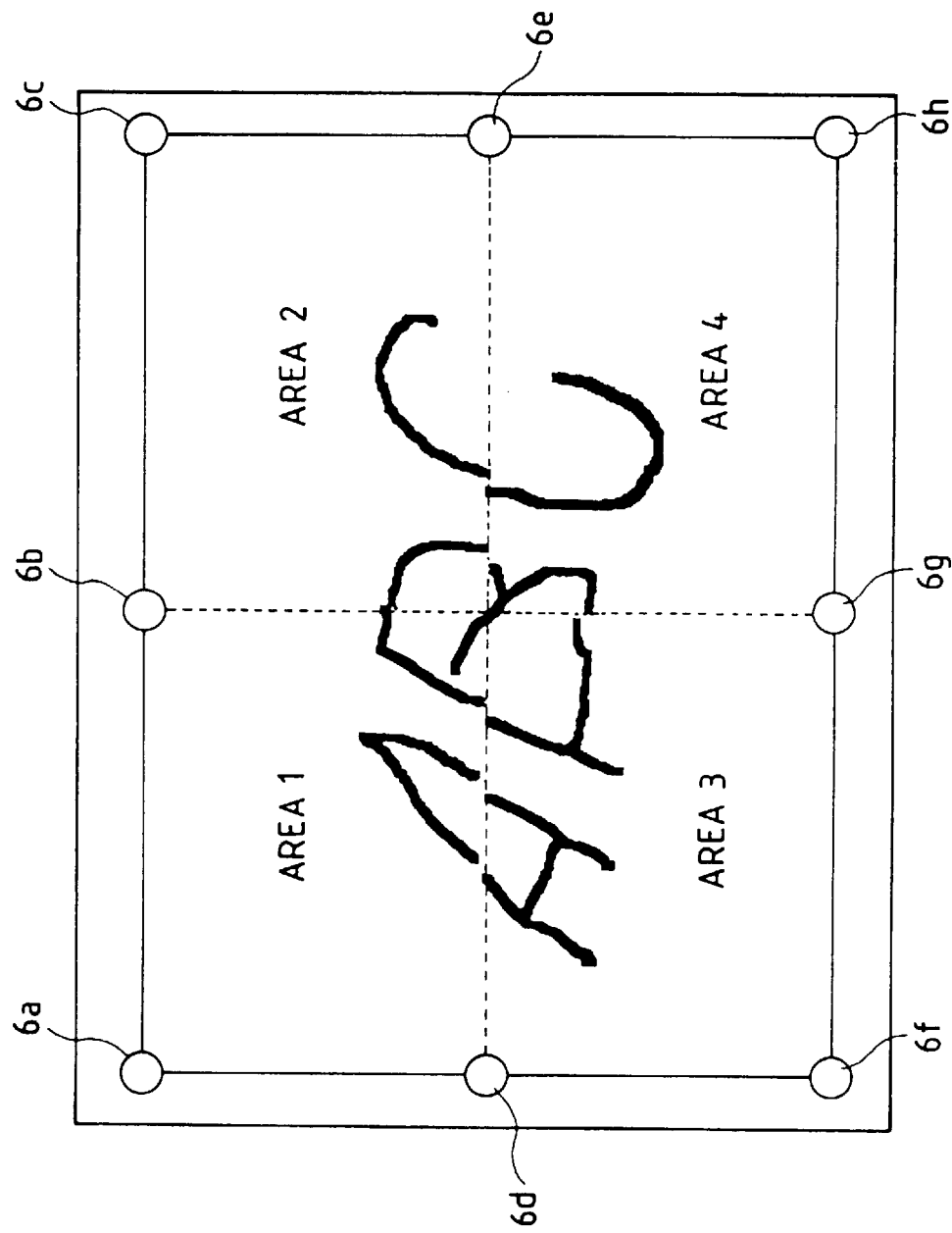
FIG. 9 is a view for explaining a conventional apparatus.

FIG. 8 is a view for explaining an operation to be performed to draw straight lines in the pointing mode.

In step S81, it is checked whether a controller 1 has received a command signal indicating that the current graphic input mode or the like is to be changed to the pointing mode. If YES in step S81, and "pen down" is determined in step S82, the input area of a vibration input pen 3 is determined in step S83 in the same manner as in the first embodiment. In step S84, vibration sensors corresponding to the input area determined in step S83 are determined. The coordinates of the initial point are calculated by using the vibration sensors determined in step S84. In step S86, an input area of the terminal point is determined. In step S87, the coordinates of the terminal point are obtained by using the vibration sensors determined in step S84 according to equations for coordinate calculation (described in the first embodiment) corresponding to the areas of the initial and terminal points.

Even in a case wherein a graphic pattern is drawn by indicating three or more points, processing can be performed in the same manner as in the case wherein a graphic pattern is drawn by indicating two points, if this scheme includes the step of designating the end of the pointing mode.

As described above, in drawing a graphic pattern by a coordinate input operation based on a pointing operation, when the present invention is executed, a coordinate output operation can be performed with high readability.

The present invention can be applied to a system constituted by a plurality of devices or an apparatus constituted by one device. In addition, as is apparent, the present invention can be applied to a case wherein the above operations can be realized by supplying programs to a system or apparatus.

As has been described above, in the coordinate input apparatus and a control method therefor according to the present invention, when a coordinate output operation is to be performed by switching many sensors for each area, continuity of the respective areas can be maintained.

What is claimed is:

1. A coordinate input apparatus comprising:
   a coordinate input surface divided into a plurality of areas;
   a plurality of coordinate detection means provided for respective areas of said coordinate input surface;
   determination means for determining in which one of the areas a position is designated on said coordinate input surface;
   selection means for selecting less than all of said plurality of coordinate detection means in response to a determination by said determination means; and
   calculation means for calculating each coordinate of an input stroke comprised of a plurality of designated positions using the selected coordinate detection means,
   wherein the input stroke comprises the designated position and a position designated in one other of the plurality of areas.

2. An apparatus according to claim 1, further comprising designation means for designating a position on said coordinate input surface.

3. An apparatus according to claim 2, wherein the predetermined time duration is defined as a duration in which a position is continuously designated on said coordinate input surface by said designation means.

4. An apparatus according to claim 2, wherein the predetermined time duration is defined as a duration from a time when said designation means is placed down on said coordinate input means to a time when said designation means is lifted up from said coordinate input means.

5. An apparatus according to claim 1, further comprising display means for displaying the calculated coordinate of the designated position.

6. An apparatus according to claim 1, wherein said determination means determines in which one of the areas a position is designated according to which one of said plurality of coordinate detection means which receives a vibration earlier than the rest.

7. A coordinate input method comprising the steps of:
   determining in which one of a plurality of areas of a coordinate input surface a position is designated;
   selecting less than all of a plurality of coordinate detection means in response to the determination in said determining step; and
   calculating each coordinate of an input stoke comprised of a plurality of designated positions using the selected coordinate detection means,
   wherein the input stroke comprises the designated position and a position designated in one other of the plurality of areas.

8. A method according to claim 7, further comprising designating a position on said coordinate input surface.

9. A method according to claim 7, wherein the predetermined time duration is defined as a duration in which a position is continuously designated on said coordinate input surface.

10. A method according to claim 7, wherein the predetermined time duration is defined as a duration from a time when a designating means is placed down on said coordinate input surface to a time when the designating means is lifted up from said coordinate input surface.

11. A method according to claim 7, further comprising displaying the calculated coordinate of the designated position.

12. A method according to claim 7, wherein the one area in which a position is designated is determined according to which one of the plurality of coordinate detection means receives a vibration earlier than the rest.

13. A computer-readable memory medium storing computer-executable process steps, the steps comprising:

a determining step to determine in which one of a plurality of areas of a coordinate input surface a position is designated;

a selecting step to select less than all of a plurality of coordinate detection means in response to the determination in said determining step; and a calculating step to calculate each coordinate of an input stroke comprised of a plurality of designated positions using the selected coordinate detection means, wherein the input stroke comprises the designated position and a position designated in one other of the plurality of areas.

14. A computer-readable memory medium storing computer-executable process steps according to claim 13, further comprising a designating step to designate a position on said coordinate input surface.

15. A computer-readable memory medium storing computer-executable process steps according to claim 13, wherein the predetermined time duration is defined as a duration in which a position is continuously designated on said coordinate input surface.

16. A computer-readable memory medium storing computer-executable process steps according to claim 13, wherein the predetermined time duration is defined as a duration from a time when a designating means is placed down on the coordinate input surface to a time when the designating means is lifted up from the coordinate input surface.

17. A computer-readable memory medium storing computer-executable process steps according to claim 13, further comprising a displaying step to display the calculated coordinate of the designated position.

18. A computer-readable memory medium storing computer-executable process steps according to claim 13, wherein the one area is determined according to which of the plurality of coordinate detection means receives a vibration earlier than the rest.

* * * * *